US012554215B2

(12) United States Patent
Suzuki

(10) Patent No.: US 12,554,215 B2
(45) Date of Patent: Feb. 17, 2026

(54) IMAGE FORMING APPARATUS

(71) Applicant: CANON KABUSHIKI KAISHA, Tokyo (JP)

(72) Inventor: Yuta Suzuki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/899,267

(22) Filed: Sep. 27, 2024

(65) Prior Publication Data

US 2025/0110428 A1 Apr. 3, 2025

(51) Int. Cl.
*G03G 15/16* (2006.01)

(52) U.S. Cl.
CPC ..... *G03G 15/1685* (2013.01); *G03G 15/1615* (2013.01); *G03G 15/1675* (2013.01); *G03G 2221/166* (2013.01)

(58) Field of Classification Search
CPC ............ G03G 15/1615; G03G 15/167; G03G 15/1674; G03G 15/1685
See application file for complete search history.

(56) References Cited

U.S. PATENT DOCUMENTS

| | | | | |
|---|---|---|---|---|
| 6,064,841 A * | 5/2000 | Matsuzaki | G03G 15/0216 | 399/176 |
| 2011/0211872 A1* | 9/2011 | Hori | G03G 15/0216 | 399/313 |
| 2022/0043372 A1* | 2/2022 | Shima | G03G 21/168 | |

FOREIGN PATENT DOCUMENTS

| | | |
|---|---|---|
| JP | 10-207185 A | 8/1998 |
| JP | 11-338280 A | 12/1999 |
| JP | 2001-249507 A | 9/2001 |
| JP | 2010-117590 A | 5/2010 |

* cited by examiner

*Primary Examiner* — Carla J Therrien
(74) *Attorney, Agent, or Firm* — Venable LLP

(57) ABSTRACT

An image forming apparatus includes an image bearing member, a transfer roller, a first bearing, a second bearing, a first holding member, a second bearing member, a first urging member, a second urging member, and a contact member. With respect to a direction in which the first holding member is urged by the first urging member, the contact member contacts the first bearing on a side upstream of a rotation center of the transfer roller so as not to be disposed on a side downstream of the rotation center of the transfer roller.

9 Claims, 10 Drawing Sheets

IMAGE FORMING APPARATUS

FIELD OF THE INVENTION AND RELATED ART

The present invention relates to an image forming apparatus, of an electrophotographic type or an electrostatic recording type, such as a copying machine, a printer, a facsimile machine, or a multi-function machine having a plurality of functions of these machines.

Conventionally, for example, in the image forming apparatus, of the electrophotographic type, such as the copying machine, a toner image formed on an image bearing member such as a photosensitive member or an intermediary transfer member is transferred onto a recording material by applying a transfer bias to a transfer roller. As the transfer roller, for example, an elastic roller provided with an elastic layer to which electroconductivity is imparted by dispersing an ion-conductive agent or the like is used. Then, an electroconductive brush or carbon chips or the like is contacted to a shaft portion of the transfer roller, so that the transfer roller is electrically connected to a power supply path. However, in the case of such a constitution, there is a possibility of an occurrence of energization failure due to abrasion of the electroconductive brush or the carbon chips and an occurrence of abnormal noise due to sliding of metals with each other.

On the other hand, in Japanese Laid-Open Patent Application No. Hei 11-338280, a constitution in which a shaft portion of a roller is rotationally supported by a bearing formed with an electroconductive resin and in which to the bearing, pressurization and electrical connection are made by an electroconductive spring is described.

However, in the above-described conventional constitution, an outer periphery of the shaft portion and an inner periphery of the bearing formed with the electroconductive resin slide with each other while being pressurized. For that reason, with use of the image forming apparatus, the shaft portion or the bearing is abraded, so that there is a possibility that a set pressurizing force cannot be applied. By that, there is a possibility that degradation of a transfer property such as image non-uniformity occurs.

SUMMARY OF THE INVENTION

Therefore, a principal object of the present invention is to provide an image forming apparatus capable of performing stable (electric) power supply with a simple constitution while suppressing an occurrence of inconveniences due to abrasion of a roller shaft portion or an electrical connecting portion to which pressurization and energization are made in the image forming apparatus.

This object has been accomplished by an image forming apparatus according to the present invention.

According to an aspect of the present invention, there is provided an image forming apparatus comprising: an image bearing member configured to bear a toner image; a transfer roller including a rotatable roller portion and a shaft portion projected from each of one end portion and the other end portion of the roller portion with respect to a rotational axis direction of the roller portion and configured to transfer the toner image borne on the image bearing member under application of a transfer voltage; a first bearing mounted to the shaft portion at the one end portion; a second bearing mounted to the shaft portion at the other end portion; a first holding member provided movably in a predetermined direction crossing a rotational axis of the transfer roller and capable of holding the first bearing, wherein the first holding member holds the first bearing so as to be detachably mountable thereto in a direction crossing the rotational axis of the transfer roller; a second bearing member provided movably in a predetermined direction crossing the rotational axis of the transfer roller and capable of holding the second bearing, wherein the second holding member holds the second bearing so as to be detachably mountable thereto in a direction crossing the rotational axis of the transfer roller; a first urging member configured to urge the first holding member toward the image bearing member; a second urging member configured to urge the second holding member toward the image bearing member; and a contact member supported movably relative to the first holding member and provided so as to be contactable to an outer peripheral surface of the first bearing, wherein the contact member forms a power supply path to the transfer roller, wherein with respect to a direction in which the first holding member is urged by the first urging member, the contact member is configured to contact the first bearing on a side upstream of a rotation center of the transfer roller so as not to be disposed on a side downstream of the rotation center of the transfer roller.

Further features of the present invention will become apparent from the following description of exemplary embodiments with reference to the attached drawings.

DESCRIPTION OF THE EMBODIMENTS

In the following, the image forming apparatus according to the present invention will be further described specifically in accordance with the drawings.

Embodiment 1

1. General Structure and Operation of Image Forming Apparatus

Figure 1:
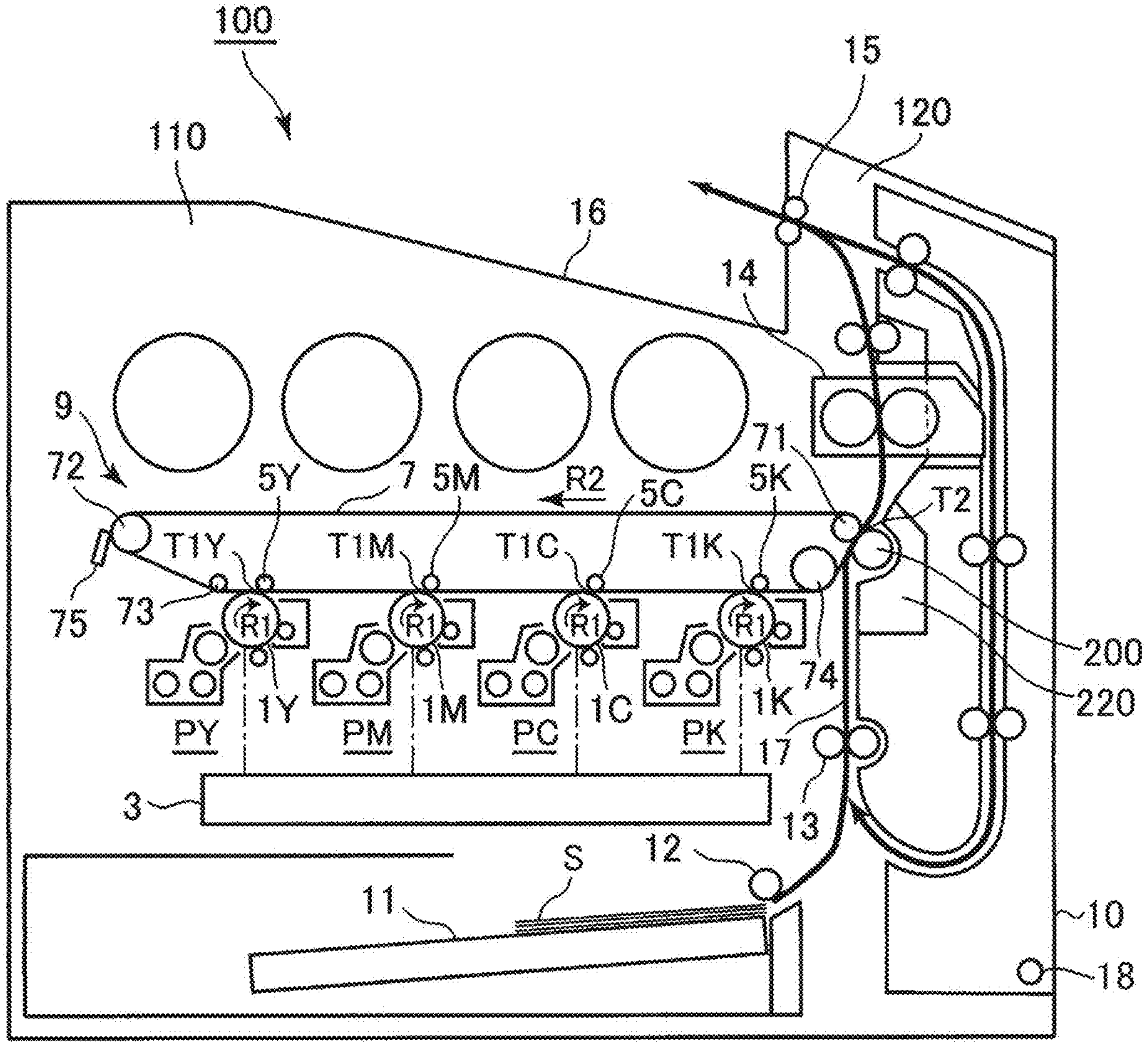
FIG. 1 is a schematic sectional view of an image forming apparatus (when a cover is closed).

First, a general structure and an operation of an image forming apparatus of this embodiment will be described. FIG. 1 is a schematic sectional view of an image forming apparatus 100 of this embodiment. The image forming apparatus 100 of this embodiment is a tandem-type laser beam printer employing an intermediary transfer type method, in which a full-color image is capable of being formed on a sheet-like recording material S such as paper or a plastic sheet by using an electrophotographic type system.

Figure 2:
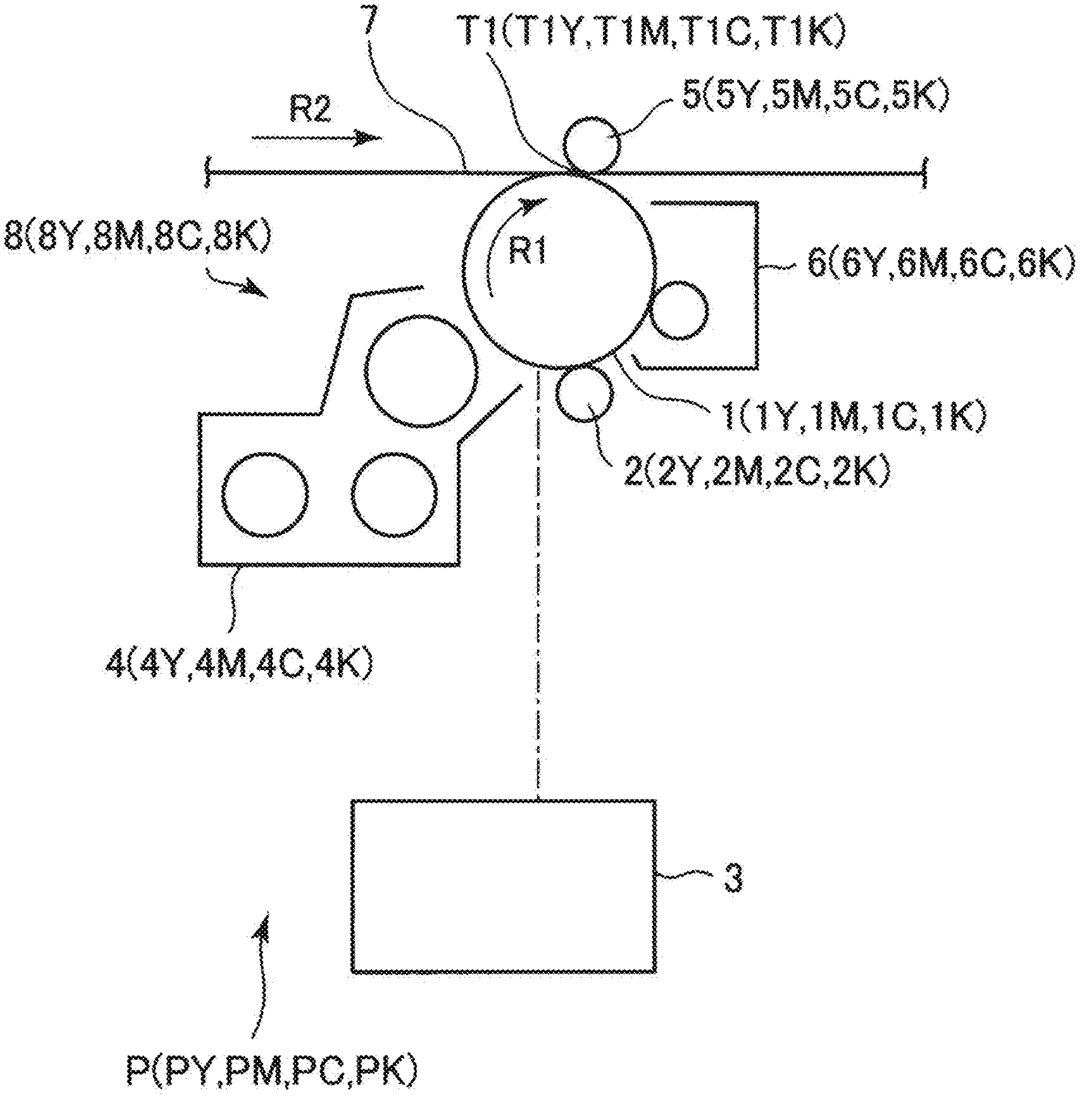
FIG. 2 is a schematic sectional view of an image forming portion.

The image forming apparatus 100 includes, as a plurality of image forming portions (stations), four image forming portions PY, PM, PC, and PK for forming images of yellow (Y), magenta (M), cyan (C), and black (K), respectively. The four image forming portions PY, PM, PC, and PK are juxtaposed along a conveying direction of an image transfer surface of an intermediary transfer belt 7 (described later). Incidentally, elements provided for the respective colors and having the same or corresponding functions or constitutions are collectively described in some instances by omitting suffixes Y, M, C, and K of reference numerals or symbols indicating the elements provided for associated one of the colors. FIG. 2 is a schematic sectional view showing a constitution of an image forming portion P in an enlarged manner. In this embodiment, the image forming portion P is constituted by a photosensitive drum 1 (1Y, 1M, 1C, 1K), a charging roller 2 (2Y, 2M, 2C, 2K), an exposure device 3, a developing device 4 (4Y, 4M, 4C, 4K), a primary transfer roller 5 (5Y, 5M, 5C, 5K), a drum cleaning device 6 (6Y, 6M, 6C, 6K), and the like. Incidentally, in this embodiment, the exposure device 3 is constituted as a single unit for exposing, to light the photosensitive drums 1Y, 1M, 1C, and 1K of the four image forming portions PY, PM, PC, and PK, but may also be provided independently for each of the image forming portions P.

Here, as regards the image forming apparatus 100 and constituent elements thereof, a front side of the drawing sheet of FIG. 1 is referred to as a "front side (front surface side)" and a rear side of the drawing sheet of FIG. 1 is referred to as a "rear side (rear surface side)". A front-rear direction connecting the front side and the rear side (direction perpendicular to the drawing sheet of FIG. 1) is substantially parallel to rotational axis directions of the photosensitive drums 1 and stretching rollers for the intermediary transfer belt 7. Further, as regards the image forming apparatus 100 and the constituent elements thereof, up and down refer to up and down in a direction of gravitation (vertical direction), but do not mean only "immediately above" and "immediately below", and include above and below a horizontal place passing through a reference position or element.

The photosensitive drum 1 which is a drum-type photosensitive member (electrophotographic photosensitive member) as a first image bearing member is rotationally driven in an arrow R1 direction (clockwise direction) in FIGS. 1 and 2. A surface of the rotating photosensitive drum 1 is electrically charged uniformly to a predetermined polarity (negative polarity in this embodiment) and to a predetermined potential by the charging roller 2 which is a roller-type charging member as a charging means. The charged surface of the photosensitive drum 1 is subjected to scanning exposure to light depending on image signal (image information) by the exposure device (laser scanner) 3 as an exposure means, so that an electrostatic latent image (electrostatic image) depending on the image signal is formed on the photosensitive drum 1.

The electrostatic latent image formed on the photosensitive drum 1 is developed (visualized) by being supplied with toner as a developer by the developing device 4 as a developing means, so that a toner image (toner picture, developer image) is formed on the photosensitive drum 1.

The intermediary transfer belt 7 which is an intermediary transfer member constituted by an endless belt as a second image bearing member is disposed opposed to the four photosensitive drums 1Y, 1M, 1C, and 1K. The intermediary transfer belt 7 is extended around, as a plurality of stretching rollers, an inner secondary transfer roller 71, a tension roller 72, a pre-primary transfer roller 73, and a pre-secondary transfer roller 74, and is stretched by predetermined tension. The intermediary transfer belt 7 is rotated (circulated and moved) in an arrow R2 direction (counterclockwise direction) in FIG. 1 by transmission thereto a driving force by drive rotation of the inner secondary transfer roller 71 functioning as a driving roller. On an inner peripheral surface side of the intermediary transfer belt 7, correspondingly to the four photosensitive drums 1Y, 1M, 1C, and 1K, the primary transfer rollers 5Y, 5M, 5C, and 5K which are roller-type primary transfer members as primary transfer means are provided, respectively. The primary transfer roller 5 presses the intermediary transfer belt 7 toward the photosensitive drum 1 and forms a primary transfer portion (primary transfer nip) T1 (T1Y, T1M, T1C, T1K) which is a contact portion between the photosensitive drum 1 and the intermediary transfer belt 7. That is, the primary transfer portion T1 is formed by sandwiching the intermediary transfer belt 7 between the primary transfer roller 5 and the photosensitive drum 1. The toner image formed on the photosensitive drum 1 is transferred (primary-transferred) in the primary transfer portion T1 onto the rotating intermediary transfer belt 7 by the action of a predetermined pressurizing force and an electric bias which are imparted by the primary transfer roller 5. During the primary transfer, to the primary transfer roller 5, a primary transfer voltage (primary transfer bias) of an opposite polarity (positive polarity in this embodiment) to a normal charge polarity which is a charge polarity of the toner during the development is applied. For example, during full-color image formation, toner images of colors of Y, M, C, and K formed on the photosensitive drums 1 are successively transferred in the primary transfer portions T1 onto the intermediary transfer belt 7 superposedly.

On an outer peripheral surface side of the intermediary transfer belt 7, in a position opposing the inner secondary transfer roller 71 as an opposing roller, an outer secondary transfer roller 200 which is a roller-type secondary transfer member (transfer roller) as a secondary transfer means is provided. The outer secondary transfer roller 200 is pressed toward the inner secondary transfer roller 71 through the intermediary transfer belt 7, and forms a secondary transfer portion (secondary transfer nip) T2 which is a contact portion between the intermediary transfer belt 7 and the outer secondary transfer roller 200. That is, the secondary transfer portion T2 is formed by sandwiching the intermediary transfer belt 7 between the inner secondary transfer roller 71 and the outer secondary transfer roller 200. The toner image formed on the intermediary transfer belt 7 is transferred (secondary-transferred) in the secondary transfer portion T2 onto a recording material S sandwiched between and conveyed by the intermediary transfer belt 7 and the outer secondary transfer roller 200 by the action of a pressurizing force and an electric bias which are imparted by the outer secondary transfer roller 200. During the secondary transfer, to the outer secondary transfer roller 200, a secondary transfer voltage (secondary transfer bias) of the opposite polarity (positive polarity in this embodiment) to the normal charge polarity of the toner is applied. The inner secondary transfer roller 71 is electrically grounded. Incidentally, to the inner secondary transfer roller 71, a secondary transfer voltage of the same polarity as the normal charge polarity of the toner may be applied, and the outer secondary transfer roller 200 may be electrically grounded.

The recording materials (transfer materials, recording mediums, sheets) S are stacked and accommodated in a recording material accommodating portion 11. The recording materials S are fed one by one by a feeding roller 12 or the like as a feeding member, and each fed recording material S is conveyed toward a registration roller pair 13. Then, this recording material S is subjected to correction of oblique movement by the registration roller pair 13, and then is sent to the secondary transfer portion T2 at an appropriate timing.

The recording material S on which the toner image is transferred is sent toward a fixing device 14. The fixing device 14 fixes (melts, sticks) the toner image on the recording material S by applying heat and pressure to the recording material S on which an unfixed toner image is carried. The recording material S on which the toner image is fixed is discharged (outputted) to an outside of an apparatus main assembly 110 of the image forming apparatus 100 by a discharging roller pair 15 as a conveying member. The recording materials S discharged from the apparatus main assembly 110 are successively stacked on a stacking portion 16 provided outside the apparatus main assembly 110.

Further, toner (primary transfer residual toner) remaining on the photosensitive drum 1 after a primary transfer step is removed and collected from the photosensitive drum 1 by the drum cleaning device 6 as a photosensitive member cleaning means. Further, on the outer peripheral surface side of the intermediary transfer belt 7, in a position opposing the tension roller 72, a belt cleaning device 75 as an intermediary transfer member cleaning means is provided. Deposited matter such as toner (secondary transfer residual toner) remaining on the intermediary transfer belt 7 after a secondary transfer step is removed and collected from the intermediary transfer belt 7 by the belt cleaning device 75.

In this embodiment, in each image forming portion P, the photosensitive drum 1, and as process means actable on the photosensitive drum 1, the charging roller 2, the developing device 4, and the drum cleaning device 6 constitute a process cartridge 8. The process cartridge 8 is made integrally detachably mountable to the apparatus main assembly 110.

Further, the intermediary transfer belt 7, the plurality of the stretching rollers 71 to 74 for stretching the intermediary transfer belt 7, the primary transfer rollers 5, the belt cleaning device 75, and the like constitute an intermediary transfer unit 9. The intermediary transfer unit 9 is made integrally detachable to the apparatus main assembly 110. Incidentally, the apparatus main assembly 110 of the image forming apparatus 100 is a portion obtained by removing the process cartridges 8 and the intermediary transfer unit 9 from the image forming apparatus 100.

2. Opening/Closing of Cover

On a right-hand side of the image forming apparatus 100 of this embodiment when the image forming apparatus 100 is viewed from the front side, a cover 10 as an openable (and closable) member capable of being opened and closed is provided. This is because clearance of a jam of the recording material S that has occurred in a conveying path 17 for the recording material S or exchange of a component part such as the outer secondary transfer roller 200 or the intermediary transfer unit 9 is performed.

Figure 3:
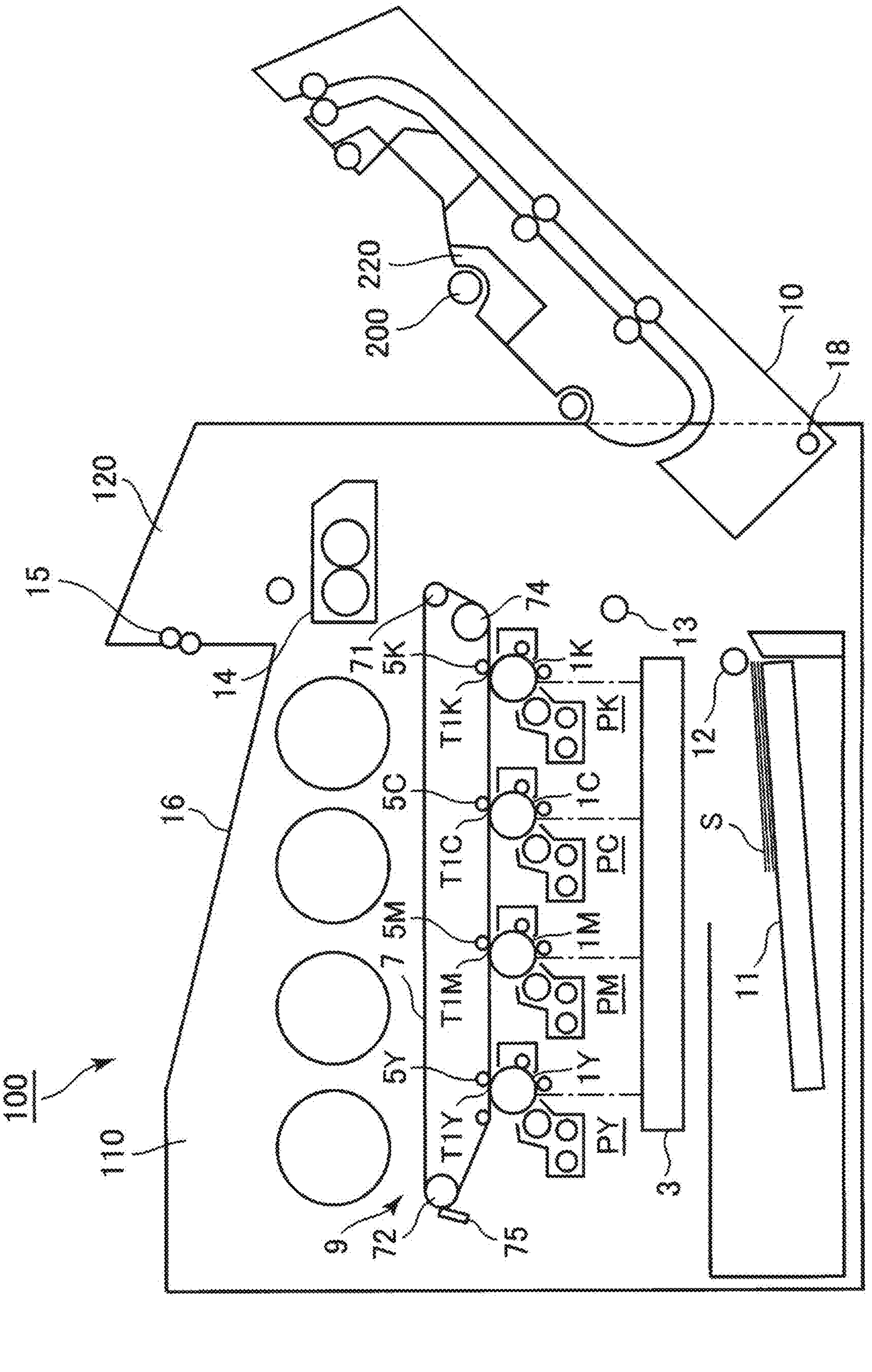
FIG. 3 is a schematic sectional view of the image forming apparatus (when the cover is open).

The cover 10 is provided with a cover rotation shaft 18. The cover 10 is supported rotatably about a rotational axis extending substantially horizontally in a front-rear direction by engagement of the cover rotation shaft 18 with a frame (not shown) constituting the casing 120 of the image forming apparatus 100. FIG. 3 is a schematic sectional view showing a state in which the cover 10 of the image forming apparatus 100 of this embodiment is opened. As shown in FIG. 3, the cover 10 is configured to be stopped at a predetermined position during opening by being supported by a link mechanism (not shown) provided so as to connect a frame of the image forming apparatus 100 and the cover 10. Incidentally, the cover 10 is configured so as to be capable of being opened and closed by a worker (operator) such as a user or a service person operating a grip (not shown).

In this embodiment, a secondary transfer unit 220 as a supporting device for supporting the outer secondary transfer roller 200 is mounted to the cover 10. As shown in FIG. 1, in a state in which the cover 10 is closed, the secondary transfer unit 220 is disposed at a predetermined position by being sandwiched by members in the apparatus main assembly 110 and the cover 10. In this embodiment, the secondary transfer unit 220 is disposed at the predetermined position by being positioned by the members in the apparatus main assembly 110. In this state, the outer secondary transfer roller 200 is press-contacted to the surface (outer peripheral surface) of the intermediary transfer belt 7 which is the second image bearing member as a contacted member wound around the inner secondary transfer roller 71, and is made operable (image formable). Further, as shown in FIG. 3, when the cover 10 is opened, the outer secondary transfer roller 200 moves together with the cover 10 in a direction of being separated from the intermediary transfer belt 7 (inner secondary transfer roller 71), so that the operator can have access to the secondary transfer unit 220. As shown in FIG. 3, when the cover 10 is opened, the secondary transfer unit 220 not only exposes the outer secondary transfer roller 200 upward but also exposes at least a part of a side surface thereof on both sides in the front-rear direction, toward the front side and the rear side, respectively. Incidentally, in a state in which the outer secondary transfer roller 200 is supported by the secondary transfer unit 220 and is mounted to the cover 10, a rotational axis direction (rotation shaft direction) of the outer secondary transfer roller 200 is substantially parallel to the front-rear direction.

3. Secondary Transfer Unit

3-1. Outer Secondary Transfer Roller

Figure 4:
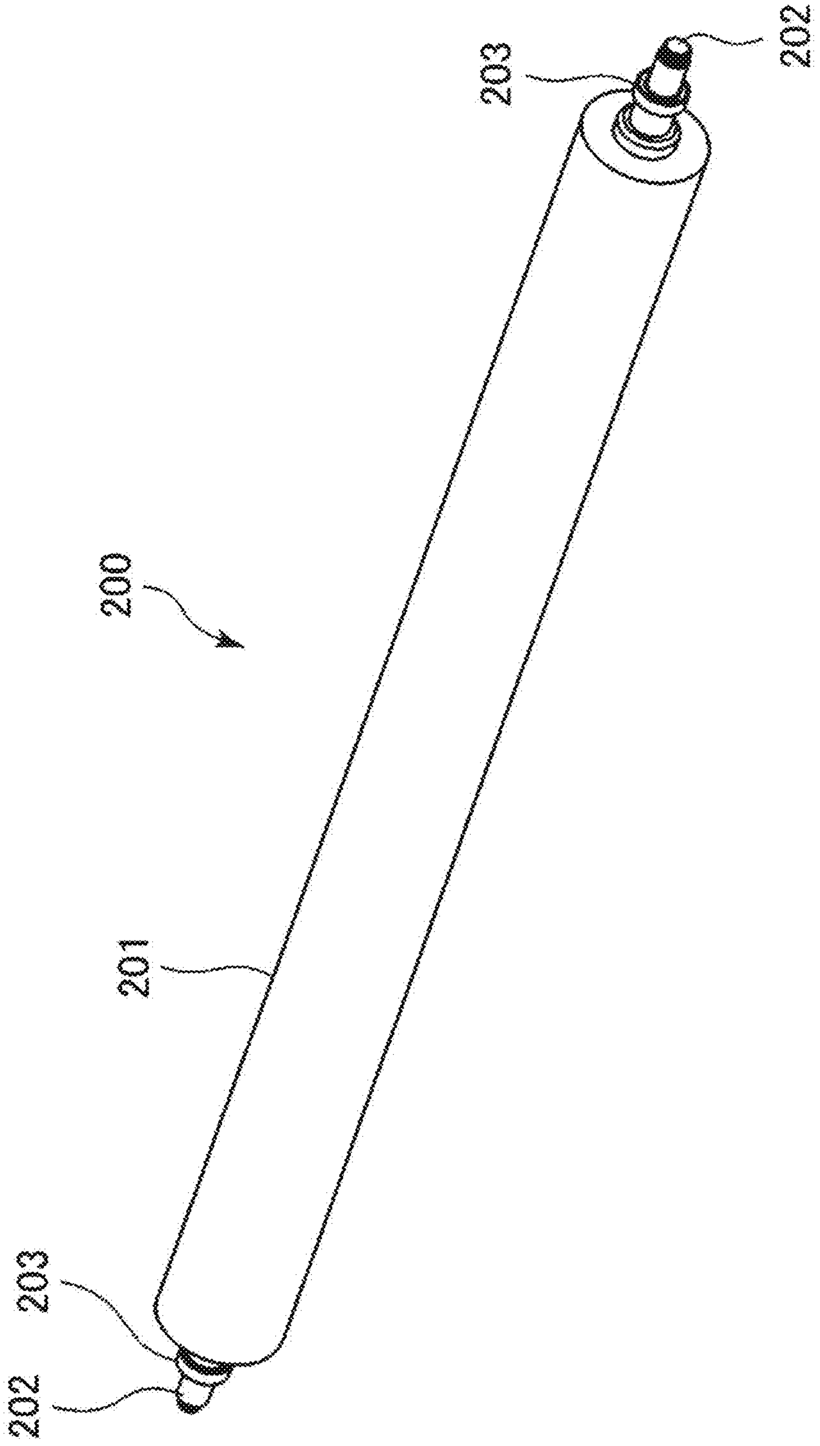
FIG. 4 is a perspective view of an outer secondary transfer roller and bearings.

Next, a constitution of the outer secondary transfer roller 200 as a roller member for exchange in this embodiment will be described. FIG. 4 is a perspective view of an outer appearance showing the outer secondary transfer roller 200 (and bearings 203 fixed thereto and described later) in this embodiment.

The outer secondary transfer roller 200 includes a roller portion 201 formed with an elastic member constituting an elastic layer (foamed elastic layer), and shaft portions 202 constituting a core metal portion. In this embodiment, the roller portion 201 is constituted by a sponge (foamed elastic member) formed by metal complex, or NBR rubber or EPDM rubber, in which an electroconductive agent such as carbon black is contained. Further, in this embodiment, the shaft portion 202 is constituted by metal. At each of opposite end portions of the outer secondary transfer roller 200 with respect to the rotational axis direction, the shaft portion 202 projects from the roller portion 201. In this embodiment, the outer secondary transfer roller 200 is formed so that the roller portion 201 (sponge layer) is 24 mm in outer diameter and 6 mm in thickness. However, the roller diameter, the thickness of the elastic layer, and the like are not limited to these values.

Further, to the shaft portions 202 disposed at the opposite end portions of the outer secondary transfer roller 200 with respect to the rotational axis direction, a pair of bearings 203 is mounted. In this embodiment, as the bearing 203, a ball bearing was used. However, the bearing 203 is not limited thereto, but for example, typically, the ball bearing or a roller bearing, which are rolling (anti-friction) bearings can be preferably used. The bearing 203 may have a general structure, and includes an outer ring, an inner ring, and a rolling element (ball in this embodiment) disposed between these rings (and in addition, may include a holding device for holding the rolling element between the outer ring and the inner ring). The bearing 203 contacts a pressing member (moving member) 216 functioning as an electrical connecting portion (described later), and has sufficient electroconductivity for connecting the outer secondary transfer roller 200 with a power supply path (energization path). In this embodiment, as regards the bearing 203, each of the outer ring, the inner ring, and the ball is constituted by metal and has sufficient electroconductivity. In this embodiment, the bearings 203 disposed at the opposite end portions of the outer secondary transfer roller 200 have the substantially same constitution.

Here, in this embodiment, each bearing 203 is press-fitted and fixed to the shaft portion 202. An outer diameter of the shaft portion 202 before the press-fitting of the bearing 203 is minutely larger than an inner diameter of the inner ring of the bearing 203. A difference between these diameters becomes a press-fitting allowance (difference). By this, after the bearing 203 is press-fitted to the shaft portion 202, the bearing 203 is not moved on the shaft portion 202 in the rotational axis direction of the outer secondary transfer roller 200 and is not disengaged from the shaft portion 202 by a normal force applied in an exchanging operation or the like of the outer secondary transfer roller 200 (described later).

3-2. Outer Secondary Transfer Roller Unit

Next, a pressurization/power supply constitution of the outer secondary transfer roller 200 in this embodiment will be described.

Figure 5:
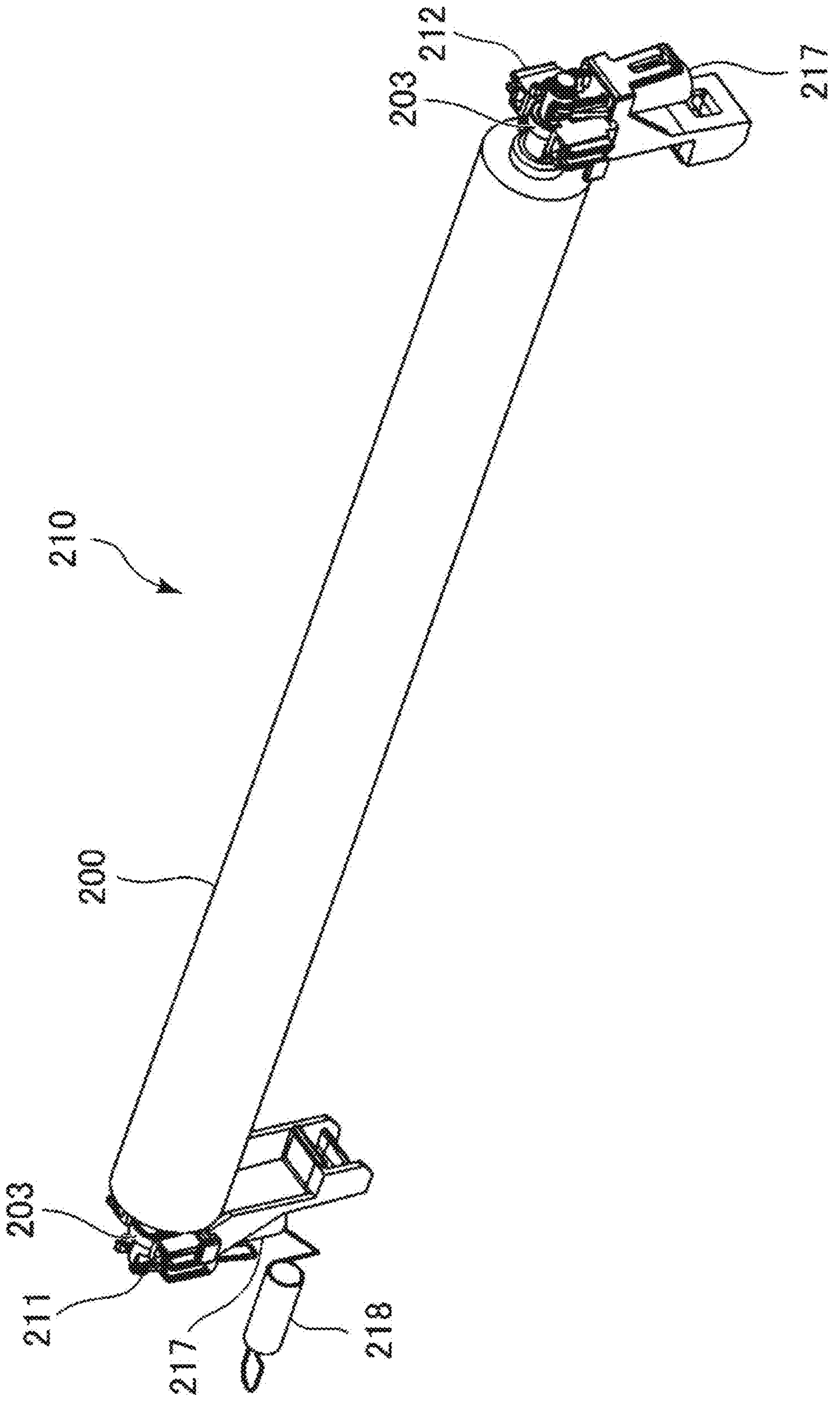
FIG. 5 is a perspective view of an outer secondary transfer roller unit.
Figure 6:
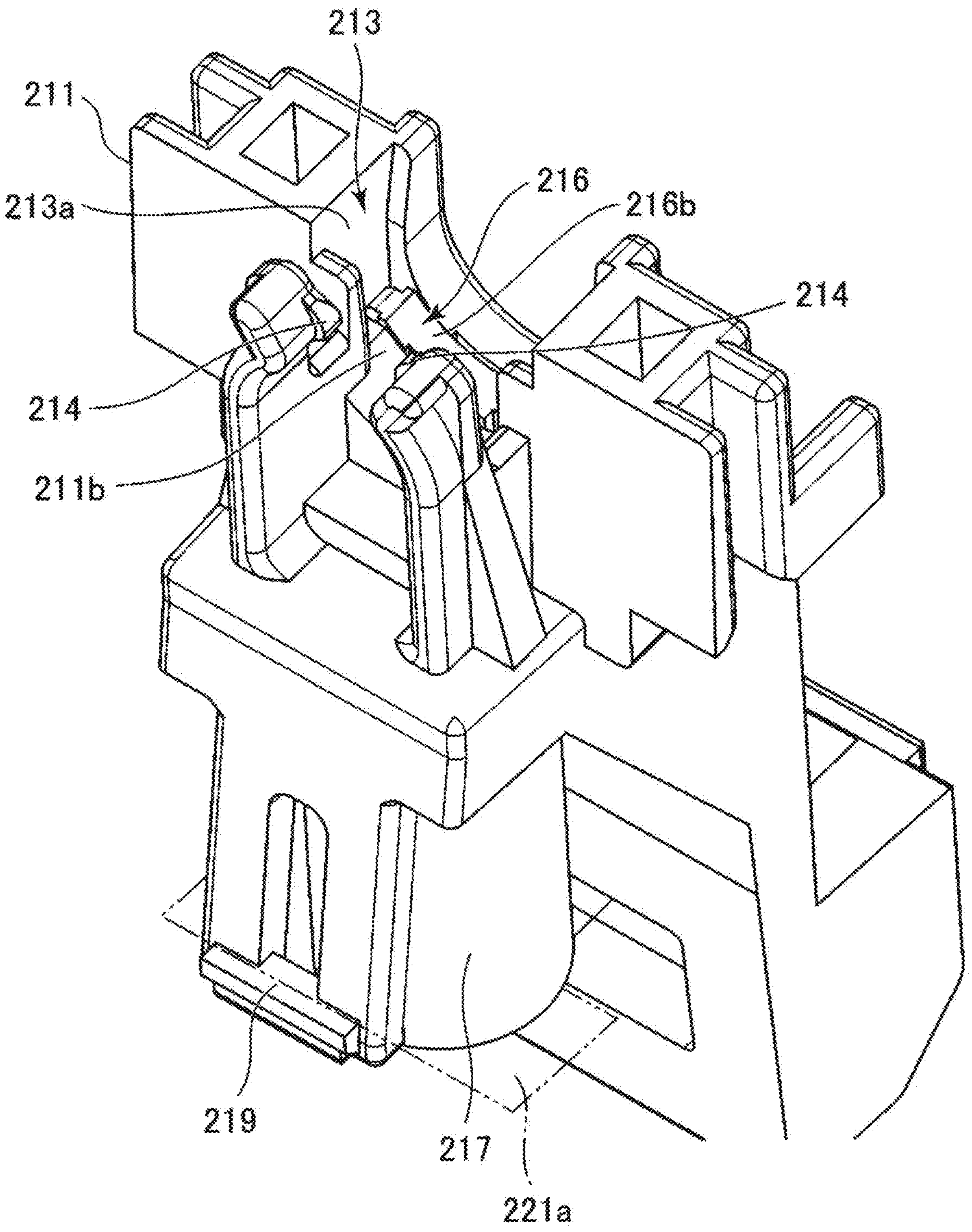
FIG. 6 is a perspective view of a pressurizing/power supply portion of the outer secondary transfer roller.
Figure 7:
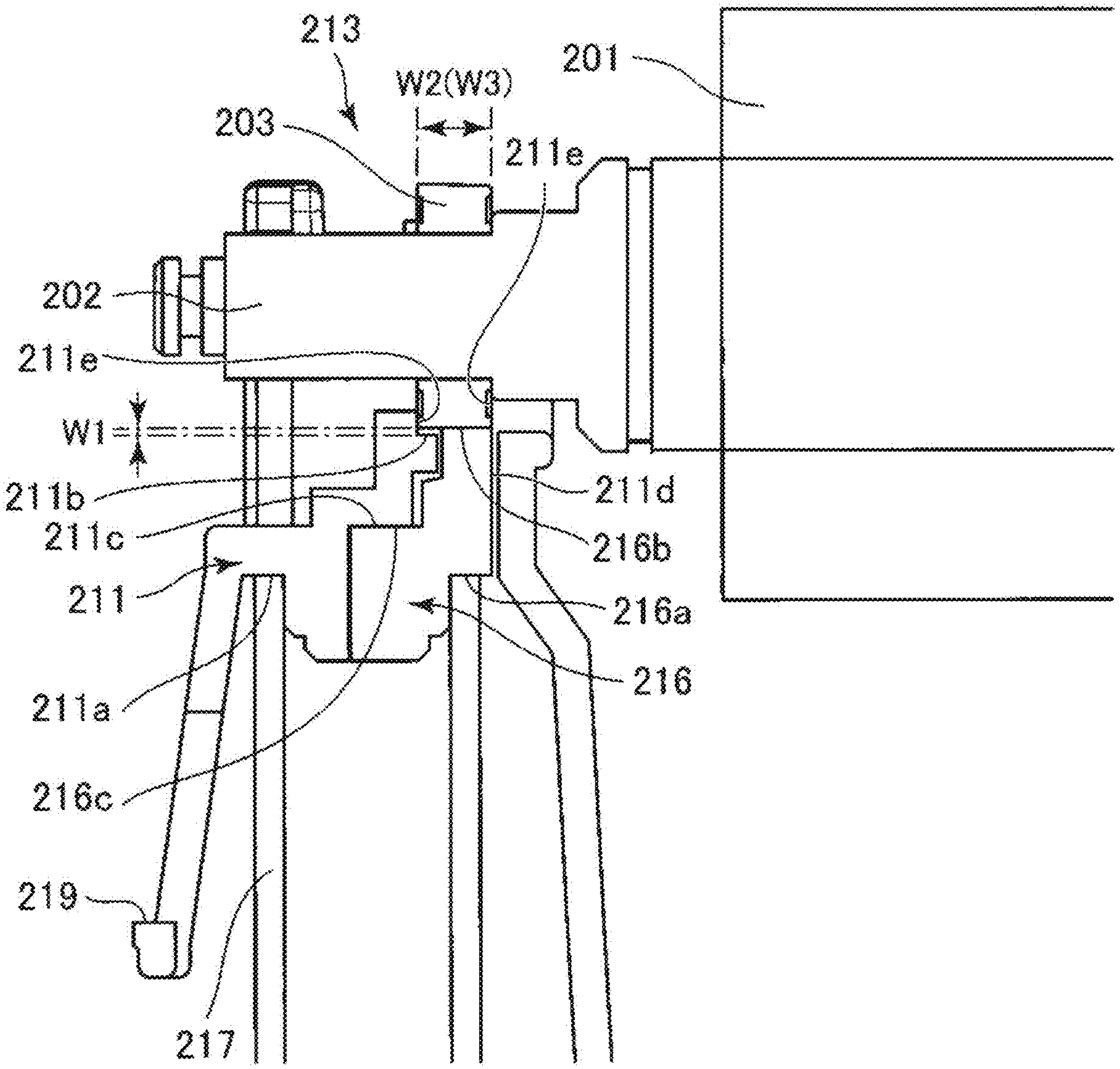
FIG. 7 is a sectional view of the pressurizing/power supply portion of the outer secondary transfer roller.
Figure 8:
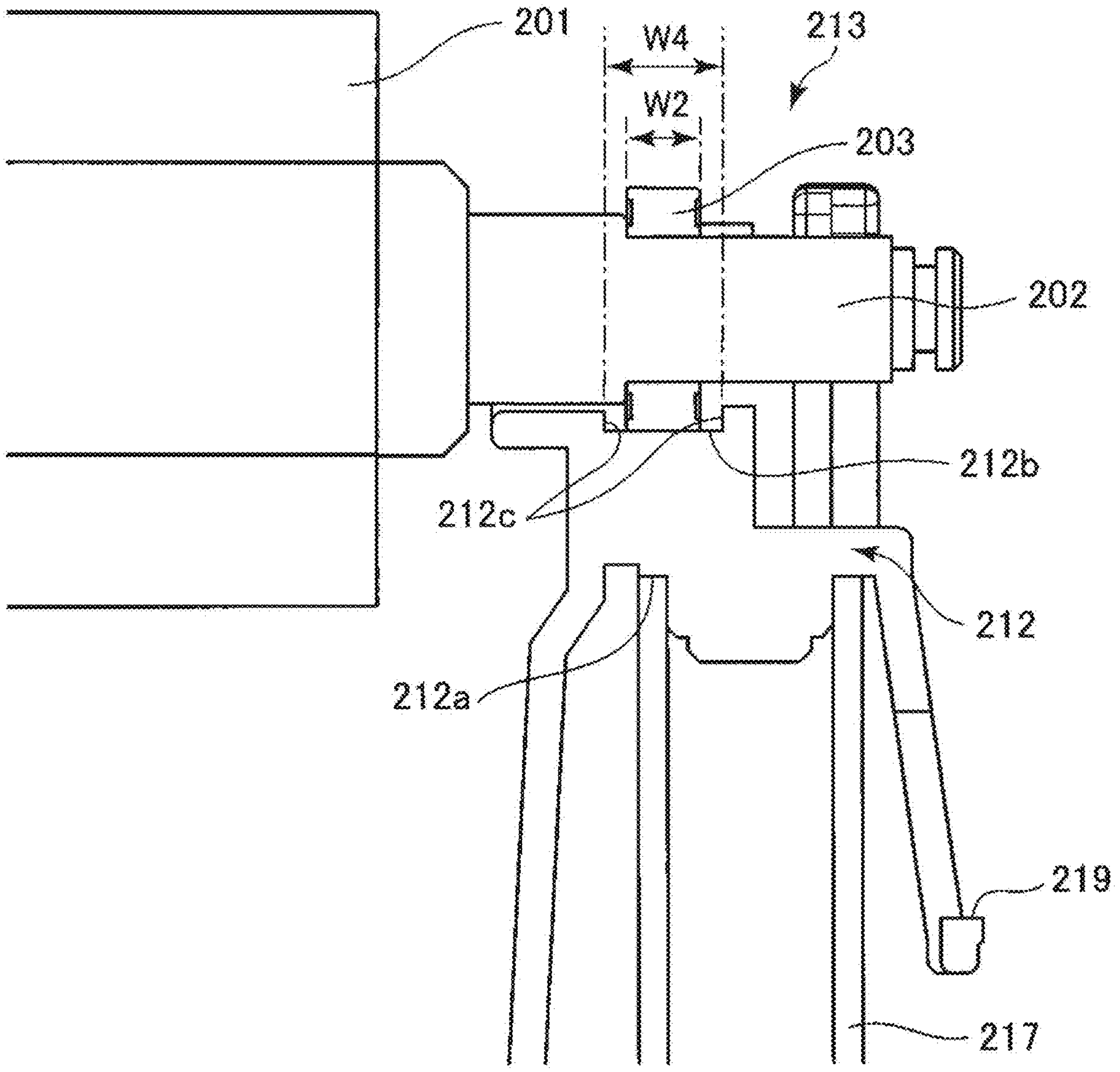
FIG. 8 is a sectional view of a pressing portion of the outer secondary transfer roller.

FIG. 5 is a perspective view of an outer secondary transfer roller unit 210 in this embodiment. In FIG. 5, a rear side of the outer secondary transfer roller 200 with respect to the rotational axis direction is shown on a left-hand side on the drawing sheet. Further, FIG. 6 is a perspective view showing the pressurization/power supply constitution of the outer secondary transfer roller 200 in this embodiment. In FIG. 6, the pressurization/power supply constitution provided at a rear-side end portion of the outer secondary transfer roller 200 with respect to the rotational axis direction is shown, and the outer secondary transfer roller 200 is omitted from illustration. Further, FIG. 7 is a sectional view (showing a cross section substantially parallel to the rotational axis direction of the outer secondary transfer roller 200) showing the pressurization/power supply constitution of the outer secondary transfer roller 200 in the rear-side end portion of the outer secondary transfer roller 200 with respect to the rotational axis direction. Further, FIG. 8 is a sectional view (showing a cross section substantially parallel to the rotational axis direction of the outer secondary transfer roller 200) showing a pressurization constitution of the outer secondary transfer roller 200 in a front-side end portion of the outer secondary transfer roller 200 with respect to the rotational axis direction.

As shown in FIG. 5, the outer secondary transfer roller 200 is supported at the opposite end portions thereof with respect to the rotational axis direction through the bearings 203 by a supporting member R (rear-side supporting member, first supporting member) 211 and a supporting member F (front-side supporting member, second supporting member) 212. In this embodiment, each of the supporting member 211 and the supporting member 212 is integrally formed with an electrically insulating resin. In this embodiment, the outer secondary transfer roller unit 210 is constituted by the outer secondary transfer roller 200 (and the bearings 203 fixed thereto), the supporting member R211 (and the pressing member 216 held thereby and described later), and the supporting member F212.

Incidentally, in this embodiment, the supporting member R211 and the supporting member F212 have a similar constitution (in which these members are substantially symmetrical with respect to a flat surface, substantially perpendicular to the rotational axis direction of the outer secondary transfer roller 200, passing through a center of the outer secondary transfer roller 200 with respect to the rotational axis direction) except that these members are different in points described later. As described later, the supporting member R211 and the supporting member F212 are principally different in constitution of presence/absence of the pressing member 216 and positioning constitution of the bearings 203.

First, with reference to FIGS. 6 and 7, the pressurization/power supply constitution of the outer secondary transfer roller 200 in the rear-side end portion of the outer secondary transfer roller 200 with respect to the rotational axis direction will be described. The supporting member R211 is supported so as to be slidably movable along a predetermined direction relative to a secondary transfer guide 221 (FIG. 9) as a holding member (described later). This predetermined direction is a direction along a direction toward the intermediary transfer belt 7 (inner secondary transfer roller 71) during the operation of the image forming apparatus 100 and along an opposite direction thereto. The supporting member R211 is pressurized by a pressurizing member 217 along the predetermined direction in the direction toward the intermediary transfer belt 7 (inner secondary transfer roller 71) during the operation of the image forming apparatus 100.

In this embodiment, the pressurizing member 217 is constituted by a compression coil spring formed of electroconductive metal. The pressurizing member 217 is disposed between a receiving portion 211*a* provided on the supporting member R211 and a bearing surface 221*a* (see FIG. 6) provided on the secondary transfer guide 221.

Further, the supporting member R211 is provided with a supporting portion 213, and to this supporting portion 213, the bearing 203 press-fitted and fixed to the shaft portion 202 of the outer secondary transfer roller 200 is mounted from above in FIG. 6. This mounting direction (inserting/extracting direction) of the bearing 203 is a direction substantially perpendicular to the rotational axis direction of the outer secondary transfer roller 200 when the outer secondary transfer roller 200 is supported by the supporting member R211 and the supporting member F212, and is a direction along the pressurizing direction of the pressurizing member 217. The supporting portion 213 is provided with an opening 213*a* which opens upward in FIG. 6 so as to be capable of receiving the bearing 203 along the mounting direction.

Further, by the supporting member R211, the pressing member 216 which is the moving member is held so as to be movable relative to the supporting member R211 along the pressurizing direction of the outer secondary transfer roller 200 by the pressurizing member 217. The pressing member 216 is accommodated slidably in a pressing member holding portion 211*d* provided to the supporting member R211. The pressing member 216 is exposed to the opening 213*a* of the supporting portion 213 so as to be contactable to the bearing 203. A bearing abutting portion (abutting surface in this embodiment) 216*b* of the pressing member 216 contactable to an outer periphery of the bearing 203 is provided adjacent to a bearing abutting portion (abutting surface in this embodiment) 211*b* of the supporting member R211 contactable to the outer periphery of the bearing 203. Each of the bearing abutting portion 211*b* of the supporting member R211 and the bearing abutting portion 216*b* of the pressing member 216 may be a flat surface, a curved surface (arcuate shape or U-shape) along the outer periphery of the bearing 203, a rib-shaped portion, or the like.

The pressing member 216 is formed of an electroconductive material, particularly an electroconductive resin in this embodiment.

Incidentally, the pressing member 216 may also be formed of another electroconductive material such as metal. Further, the pressing member 216 is pressurized by the pressurizing member 217 for pressurizing the above-described supporting member R211. This pressurizing direction is a direction along a slide movement direction of the supporting member R211 as described above, and is a direction toward the bearing 203 disposed on the supporting portion 213. That is, the pressurizing member 217 is not only disposed between the receiving portion 211*a* of the supporting member R211 and the bearing surface 221*a* of the secondary transfer guide 221 as described above, but also disposed between a receiving portion 216*a* provided on the pressing member 216 and the bearing surface 221*a* of the secondary transfer guide 221. By this, the pressurizing member 217 contacts the supporting member R211 and pressurizes the supporting member R211, and in addition, contacts the pressing member 216 and pressurizes the pressing member 216 toward the bearing 203, and thus causes the pressing member 216 to contact and press the bearing 203. Further, in this embodiment, as shown in FIG. 5, a press (energizing) member 218 supplied with a transfer current (transfer voltage) from a high-voltage power source provided in the image forming apparatus 100 is provided so as to contact the pressurizing member 217. In this embodiment, the press member 218 is constituted by an electroconductive spring. By this, in this embodiment, a power supply path (energizing path) from the high-voltage power source is connected to the outer secondary transfer roller 200 through the press member 218, the pressurizing member 217, the pressing member 216, and the bearing 203.

In a state in which the cover 10 is opened, i.e., in a state in which the outer secondary transfer roller 200 is separated from the intermediary transfer belt 7, the pressing member 216 pressed by the pressurizing member 217 is locked by the supporting member R211. That is, the supporting member R211 is provided with a locking portion 211*c*, and the pressurizing member 217 is provided with a portion-to-be-locked 216*c* engageable with this locking portion 211*c*. Further, in a state in which the locking portion 211*c* and the portion-to-be-locked 216*c* are engaged with each other, the bearing abutting portion 216*b* of the pressing member 216 projects further toward the bearing 203 side along the pressurizing direction of the pressurizing member 217 than the bearing abutting portion 211*b* of the supporting member R211. In this state, at least a part of the bearing abutting portion 216*b* of the pressing member 216 projects further toward the bearing 203 side than the bearing abutting portion 211*b* of the supporting member R211 by a projection amount W1. When the outer secondary transfer roller 200 contacts the intermediary transfer belt 7, a pressurizing force by the pressurizing member 217 is applied to the bearing 203 through the bearing abutting portion 211*b* of the supporting member R211. Further, at this time, the bearing abutting portion 216*b* of the pressing member 216 applies the pressurizing force by the pressurizing member 217 to the bearing 203 while being retracted to a degree such that the bearing abutting portion 216*b* is substantially flush with the bearing abutting portion 211*b* of the supporting member P211. From the viewpoint of pressurizing stability of the outer secondary transfer roller 200, the above-described projection amount W1 may preferably be 0.1 mm or more and about 1 mm or less, and is about 0.3 mm in this embodiment.

By employing such a constitution, when the outer secondary transfer roller 200 is contacted to the intermediary transfer belt 7, the bearing 203 and the pressing member 216 can be contacted to each other more reliably. By this, electrical connection between the bearing 203 and the pressing member 216 can be made more reliably. Further, the pressurizing force of the pressurizing member 217 is applied to the bearing 203 by the supporting member R211 which is easily constituted so as to be made stronger than the pressing member 216 formed of the electroconductive resin, and in addition, the pressurizing force of the pressurizing member 217 can be utilized for pressing between the pressing member 216 and the bearing 203.

By this, with a simple constitution, the electrical connection between the bearing 203 and the pressing member 216 can be made more reliably, and in addition, application of the pressurizing force to the bearing 203 by the pressurizing member 217 can be performed more reliably. Further, by employing such a constitution, the pressing member 216 is disposed within a region in which the bearing 203 is projected along the pressurizing direction of the pressurizing member 217. That is, when the pressing member 216 is viewed along the pressurizing direction of the pressurizing member 217 form the outer secondary transfer roller 200 side, the pressing member 216 is hidden on the back side of the bearing 203. By this, it is possible to reduce a possibility that in the state in which the cover 10 is opened, the operator touches an electrical connecting portion to the outer secondary transfer roller 200 and thus the outer secondary transfer roller 200 is contaminated or broken.

Next, with reference to FIG. 8, the pressurization constitution of the outer secondary transfer roller 200 in the front-side end portion of the outer secondary transfer roller 200 with respect to the rotational axis direction will be described. As described above, in this embodiment, the supporting member F212 has a constitution similar to the constitution of the supporting member R211. However, in this embodiment, as shown in FIG. 8, the supporting member F212 is not provided with the above-described pressing member 216 which is provided to the supporting member R211. The supporting member F212 receives the pressurizing force of the pressurizing member 217 by a receiving portion 212*a*, and in addition, supports the bearing 203 by a bearing abutting portion 212*b*.

Similarly as in the case of the supporting member R211, the supporting member F212 is provided with the supporting portion 213, and to this supporting portion 213, the bearing 203 press-fitted and fixed to the shaft portion 202 of the outer secondary transfer roller 200 is mounted from above in FIG. 8.

At this time, in this embodiment, the outer secondary transfer roller 200 is translationally moved (substantially only by this translational movement) along a predetermined direction so that the bearings 203 disposed at the opposite end portions with respect to the rotational axis direction are received by the supporting portions 213 of the supporting member R211 and the supporting member F212, respectively, so that the outer secondary transfer roller 200 is assembled with the supporting member R211 and the supporting member F22 and thus a position of the outer secondary transfer roller 200 with respect to the rotational axis direction can be determined. In this embodiment, the supporting portion 213 of the supporting member R211 is configured so as to be engaged with the bearing 203 of the outer secondary transfer roller 200 with respect to the rotational axis direction. On the other hand, the supporting portion 213 of the supporting member F212 is configured so as to ensure play relative to the bearing 203 with respect to the rotational axis direction of the outer secondary transfer roller 200. Specifically, as shown in FIG. 7, as regards the supporting member R211, a relationship such that engagement is realized by setting a width W2 between side walls 211*e* and 211*e* of the supporting portion 213 opposing opposite side surfaces of the bearing 203 with respect to the rotational axis direction of the outer secondary transfer roller 200 so as to be substantially equal to a width W3 of the bearing 203 is established. By this, in the supporting member R211, the position of the outer secondary transfer roller 200 to which the bearing 203 is fixed is determined. On the other hand, as shown in FIG. 8, as regards the supporting member F212, a relationship such that play is provided by setting a width W4 between side walls 212*c* and 212*c* of the supporting portion 213 opposing the opposite side surfaces of the bearing 203 with respect to the rotational axis direction of the outer secondary transfer roller 200 so as to be made wider than the width W3 of the bearing 203 is established. By this, even in the case where there was a variation in length (between the pair of bearings 203) of the outer secondary transfer roller 200 with respect to the rotational axis direction, the outer secondary transfer roller 200 can be assembled with the supporting member R211 and the supporting member F212. In order to realize contact between the pressing member 216 and the bearing 203 which constitute the electrical connecting portion more reliably, it is preferable that a position of the bearing 203 (the outer secondary transfer roller 200) is determined on the supporting member R211 side which is a power supply side.

Thus, in this embodiment, the outer secondary transfer roller 200 is supported by the supporting member R211 and the supporting member F212 through the pair of bearings 203 fixed to the opposite end portions thereof with respect to the rotational axis direction, and is pressurized toward the intermediary transfer belt 7. Further, in this embodiment, the pressurizing force of the pressurizing member 217 for pressurizing the supporting member R211 is also utilized for pressing the pressing member 216, constituting an electric contact to the outer secondary transfer roller 200, against the bearing 203. Here, when the outer secondary transfer roller 200 is rotated, the outer ring of the bearing 203 is not rotated, and therefore, compared with a constitution in which a bearing formed of an electroconductive resin is directly contacted to a roller shaft portion, it is possible to reduce (substantially eliminate) abrasion of the pressing member 216 formed of the electroconductive resin.

Incidentally, to each of the supporting member R211 and the supporting member F212, a roller retaining portion 214 is also provided, so that disengagement of the mounted outer secondary transfer roller 200 is suppressed (details thereof will be described later).

3-3. Secondary Transfer Guide

Next, with reference to FIGS. 9 and 10, a constitution of the secondary transfer guide 221 as the holding member which is a mounted portion of the outer secondary transfer roller unit 210 and a constitution of the secondary transfer unit 220 will be described.

Figure 9:
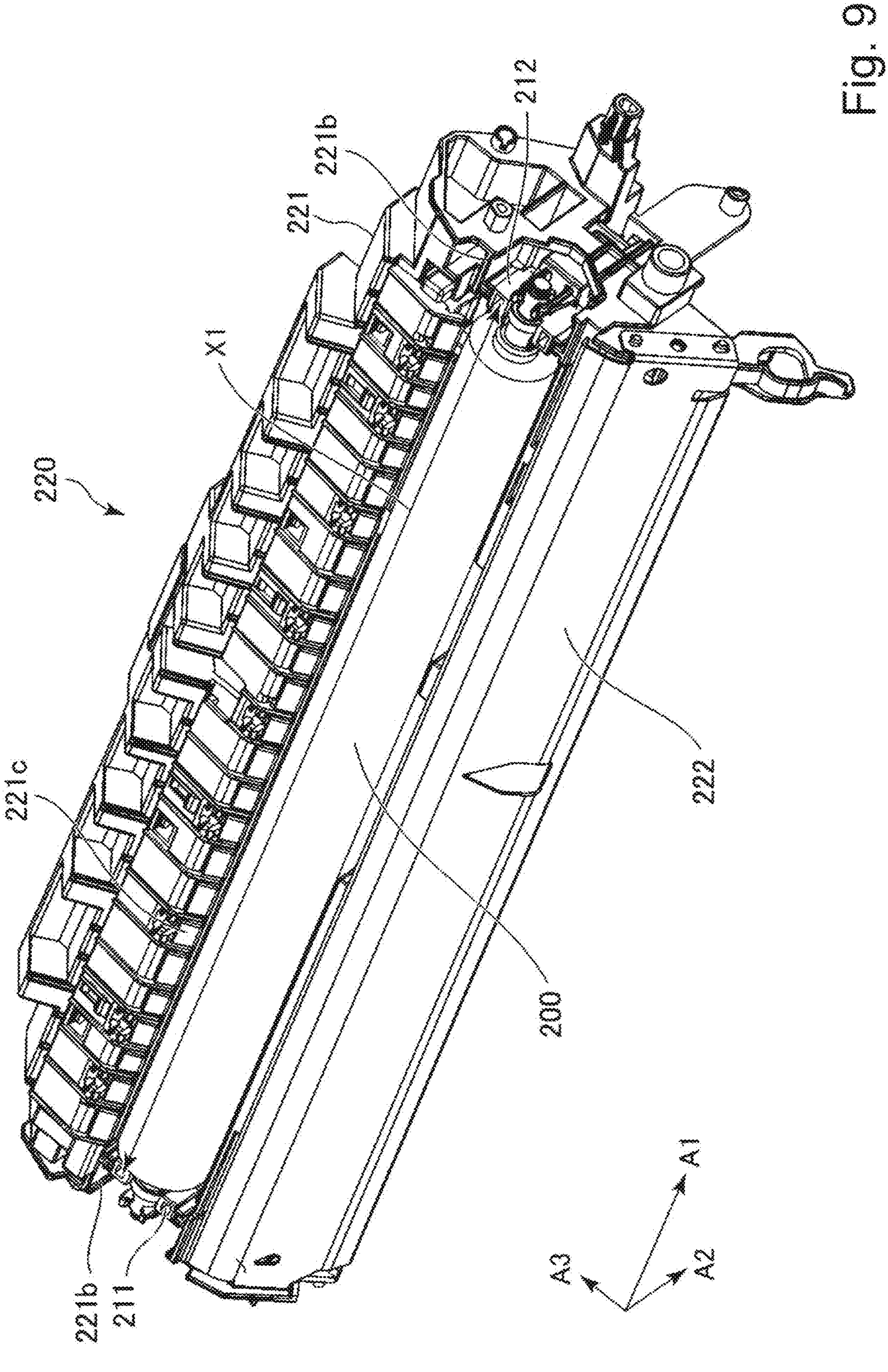
FIG. 9 is a perspective view of a secondary transfer unit.

FIG. 9 is a perspective view of an outer appearance of the secondary transfer unit 220. In FIG. 9, a rear side of the outer secondary transfer roller 200 with respect to the rotational axis direction is shown on a left-hand side of the drawing sheet. Further, FIG. 10 is a front view of the secondary transfer unit 220 on one end portion side of the outer secondary transfer roller 200. In FIG. 10, the neighborhood of the front-side end portion of the outer secondary transfer roller 200 with respect to the rotational axis direction is shown, and the secondary transfer guide 221 is omitted from illustration. Here, as shown in FIGS. 9 and 10, the rotational axis direction of the outer secondary transfer roller 200 is taken as an A1 direction, the inserting/extracting direction of the outer secondary transfer roller 200 in the secondary transfer unit 220 is taken as an A2 direction (in which the mounting direction is +(plus) direction, and a direction perpendicular to the A1 direction and the A2 direction is taken as an A3 direction.

The secondary transfer unit 220 in this embodiment is constituted by including the secondary transfer guide 221 provided with a sheet guiding portion 222 for guiding the recording material (sheet) S conveyed from an upstream side of a conveying path, and including the outer secondary transfer roller unit 210.

The secondary transfer guide 211 includes, at opposite end portions with respect to the A1 direction, supporting member holding portions 221*b* and 221*b* for holding the supporting members R211 and F212, respectively, so as to be slidably movable.

Between the supporting member holding portions 221*b* and 221*b* at these opposite end portions, an accommodating portion 221*c* in which the outer secondary transfer roller 200 supported by the supporting member R211 and the supporting member F212 is accommodated is formed. With respect to the A1 direction, a gap X1 between the supporting portions 213 of the supporting member R211 and the supporting member F212 is a region of an accommodating portion 222*b*. Further, the bearing 203 press-fitted and fixed to the outer secondary transfer roller 200 is mounted to the supporting portion 213 of each of the supporting member R211 and the supporting member F212, so that positioning of the outer secondary transfer roller 200 with respect to the A1 direction is made. Further, also, with respect to the A3 direction, the outer secondary transfer roller 200 is positioned by establishing an engagement relationship of the bearings 203 with the supporting portions 213 of the supporting member R211 and the supporting member F212.

Figure 10:
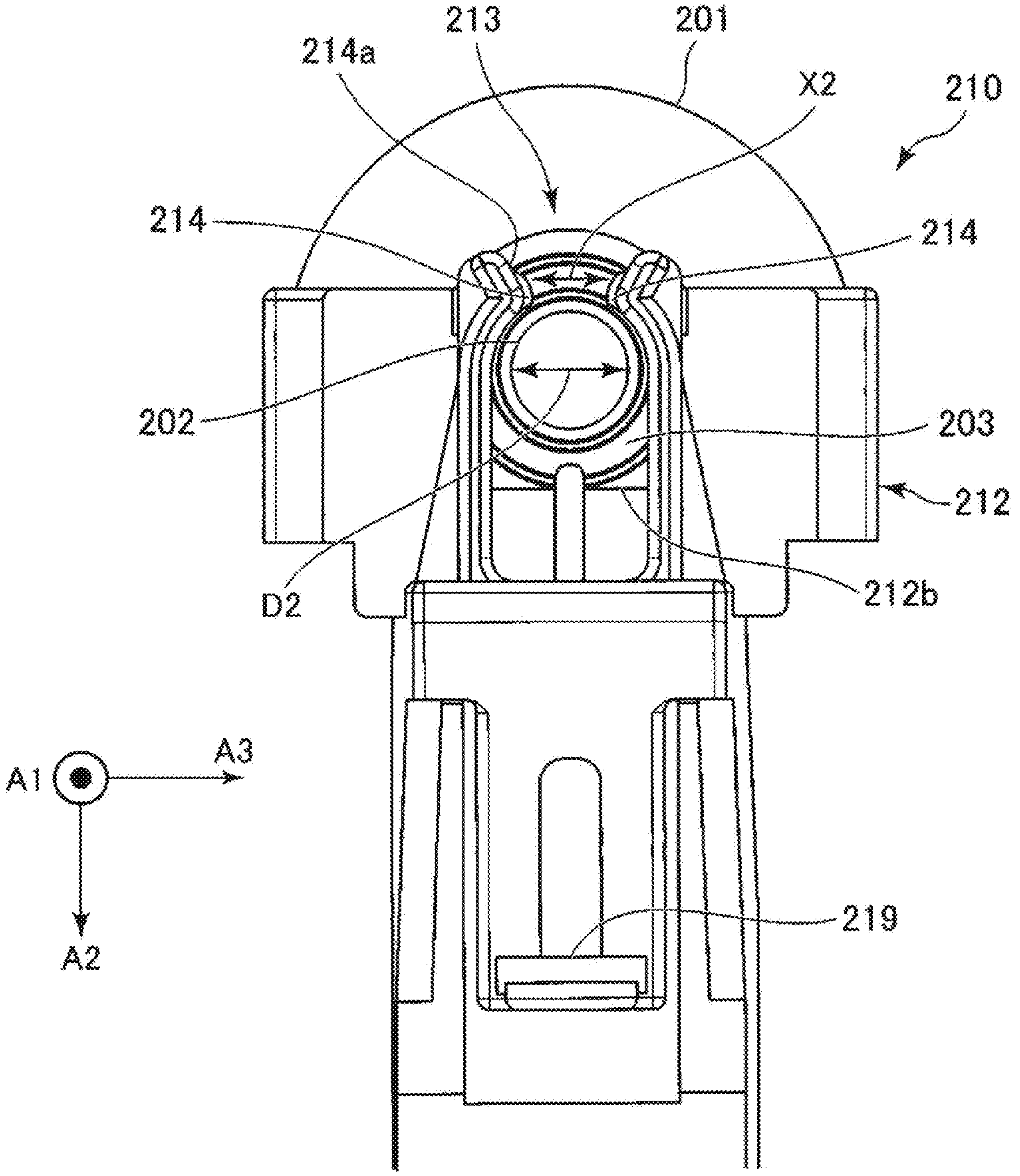
FIG. 10 is a front view of the outer secondary transfer roller unit on one end portion side of the outer secondary transfer roller.

Further, as shown in FIG. 10, the roller retaining portion 214 is integrally formed with each of the supporting member R211 and the supporting member F212. The roller retaining portion 214 is provided so as to oppose the shaft portion 202 on each of both sides of a plane substantially parallel to the A2 direction passing through a center of the shaft portion 202 as viewed in the A1 direction. These roller retaining portions 214 on both sides have flexibility such that each roller retaining portion 214 can be sent so as to be separated from the above-described plane. Further, between these roller retaining portions 214 on both sides, an opening 214*a* which opens upward in FIG. 10, i.e., toward an upstream side of the mounting direction (+A2 direction) of the outer secondary transfer roller 200, is provided. As shown in FIG. 10, when, with respect to the A3 direction, a width of the opening 214*a* between the roller retaining portions 214 on the above-described both sides is taken as X2 and a diameter of the shaft portion 202 is taken as D2, a relationship of: X2<D2 holds. That is, the outer secondary transfer roller 200 is configured so as not to be disengaged from the supporting member R211 and the supporting member F212 by being moved in −A2 direction unless the roller retaining portions on the above-described both sides are bent outward so as to be separated from each other along the A3 direction under application of a predetermined load.

3-4. Exchange Procedure of Outer Secondary Transfer Roller 200

Next, a procedure when the outer secondary transfer roller 200 is exchanged will be described. In the case where the outer secondary transfer roller 200 is exchanged, first, the operator opens the cover 10 and exposes the secondary transfer unit 220 as shown in FIG. 3. At this time, the supporting member R211 and the supporting member F212 are projected by the force of the pressurizing member 217. However, a constitution in which a supporting member retaining portion 219 (FIGS. 6 and 10) provided to each of the supporting member R211 and the supporting member F212 is looked by an engaging portion (not shown) provided to the secondary transfer guide 221 is employed. For that reason, the supporting member R211 and the supporting member F212 stop at predetermined positions, and thus are not projected (disengaged) from the secondary transfer guide 221.

The operator grips the shaft portion 202 of the outer secondary transfer roller 200 and raises the outer secondary transfer roller 200 (and the bearings 203 fixed thereto) along the inserting/extracting direction of the outer secondary transfer roller 200 (−A2 direction). Then, the shaft portion 202 of the outer secondary transfer roller 200 bends the roller retaining portions 214, so that the outer secondary transfer roller 200 is disengaged from the secondary transfer unit 220. Thus, an operation for disengaging the outer secondary transfer roller 200 from the apparatus main assembly 110 (the secondary transfer unit 220) is completed.

Next, by a procedure reverse to the procedure of the above-described disengaging operation, an outer secondary transfer roller 200 (and bearings 203 fixed thereto) for exchange, which is a new outer secondary transfer roller 200 is usually mounted to the secondary transfer unit 220. In a state in which the operator grips the shaft portion 202 of the outer secondary transfer roller 200 for exchange, the operator presses the bearings 203 against the secondary transfer unit 220 so as to be engaged with the supporting portions 213, so that the roller retaining portions 214 are bent. By this, the outer secondary transfer roller 200 is mounted to the secondary transfer unit 220. At this time, the bearings 203 are contacted to the bearing abutting portion 211*b* of the supporting member R211 and the bearing abutting portion 216*b* of the pressing member 216, and to the bearing abutting portion 212*b* of the supporting member F212, respectively.

Finally, the operator closes the cover 10, so that a mounting operation of the outer secondary transfer roller 200 for exchange is completed.

Thus, according to the constitution of this embodiment, when the outer secondary transfer roller 200 is rotated, the outer ring of the bearing 203 is not rotated, and therefore, the pressing member 216 pressed against the bearings 203 is not abraded. For that reason, for example, a risk of an image defect such as pitch non-uniformity due to a change in transfer pressure (pressurizing force) can be reduced.

Further, according to the constitution of this embodiment, when the exchanging operation of the outer secondary transfer roller 200 is performed, the bearings 203 are press-fitted to the shaft portion 202, and therefore, are not moved and dropped.

By this, risks that it becomes difficult to dispose a component part at a predetermined position in the exchanging operation of the outer secondary transfer roller 200 and that the component part is dropped are reduced, so that operativity of the exchange of the outer secondary transfer roller 200 is improved. Further, in this embodiment, a function of the roller retaining portion 214 was imparted to the supporting member R211 and the supporting member F212, i.e., the apparatus main assembly 110 (the secondary transfer unit 220) side. By this, a constitution of the outer secondary transfer roller 200 to be exchanged can be made minimum, so that a cost required for the exchange can be reduced.

Incidentally, in this embodiment, the case where a roller which is an exchange object is the outer secondary transfer roller 200 was described, but the present invention is not limited thereto. The exchange object (roller) may also be another roller to be pressurized and energized in the image forming apparatus. Further, the roller may also be a roller to be drive-rotated and a roller to be driven-rotated.

Further, in this embodiment, the supporting member F212 was not provided with the pressing member 216, but a constitution in which a pressing member is provided to a supporting member on each of opposite end portion sides of the roller with respect to the rotational axis direction may also be employed.

Further, in this embodiment, the pressurizing member 217 constituted the power supply path to the pressing member 216. By this, as described above, with a simple constitution, it is possible to perform pressurization of the supporting member and the pressing member and connection of the power supply path to the pressing member. However, separated from the pressurizing member, the power supply path to the pressing member may also be provided. For example, a first pressurizing member for pressurizing the supporting member toward the bearing and a second pressurizing member (electroconductive spring) for pressurizing the pressing member toward the bearing may be provided separately from each other.

4. Effect

As described above, in this embodiment, the image forming apparatus 100 is provided with the image bearing member (intermediary transfer belt) 7 for bearing the toner image, and the rotatable roller 200 including the shaft portion 202 projected from each of one end portion and the other end portion thereof with respect to the rotational axis direction, and includes the roller (outer secondary transfer roller) 200 contactable to the image bearing member 7, a first bearing 203 mounted to the shaft portion 202 at the above-described one end portion, a second bearing 203 mounted to the shaft portion 202 at the above-described other end portion, a first supporting member (supporting member R) 211 for supporting the roller 200 through the first bearing 203, a second supporting member (supporting member F) 212 for supporting the roller 200 through the second bearing 203, a first pressurizing member 217 for pressurizing the first supporting member 211 toward the image bearing member 7 along a predetermined direction, a second pressurizing member 217 for pressurizing the second supporting member 212 toward the image bearing member 7 along the predetermined direction, and the moving member (pressing member) 216, which is the moving member 216 held by the first supporting member 211 so as to be movable relative to the first supporting member 211 along the predetermined direction and which forms the power supply path to the roller 200 through the first bearing 203 in contact with the first bearing 203 by being urged toward the first bearing 203.

In this embodiment, the first pressurizing member 217 pressurizes the first supporting member toward the image bearing member 7 along the above-described predetermined direction, and in addition, pressurizes the moving member 216 toward the first bearing 203 along the predetermined direction, so that the moving member 216 is pressed against the first bearing 203. Further, in this embodiment, in a state in which the roller 200 is separated from the image bearing member 7, the moving member 216 is urged, so that at least a part of the abutting portion 216*b* of the moving member 216 contactable to the outer periphery of the first bearing 203 projects further toward the first bearing 203 side along the predetermined direction than the abutting portion 211*b* of the first supporting member 211 contactable to the outer periphery of the first bearing 203 projects. Further, in this embodiment, the moving member 216 is disposed within a region in which the first bearing 203 is projected along the predetermined direction. Further, in this embodiment, the first pressurizing member 217 constitutes the power supply path to the moving member 216. Further, in this embodiment, the moving member 216 is held only by the first supporting member 211 of the first and second supporting members 211 and 212. Further, in this embodiment, the roller 200 is rotated in a state in which the roller 200 is pressurized against the image bearing member 7. Further, in this embodiment, the power supply path to the image bearing member 7 is formed. Further, in this embodiment, the moving member 216 is formed of the electroconductive resin. Further, in this embodiment, the roller 200 is the transfer roller for transferring the toner from the image bearing member 7 onto the recording material S while nipping the recording material S between itself and the image bearing member 7.

Further, according to this embodiment, to the outer periphery of the bearing mounted to the roller, the pressing member having the functions of application of the pressurizing force and electrical connection is contacted, and therefore, it becomes possible to suppress an occurrence of inconveniences due to the abrasion. Further, according to this embodiment, the component parts mounted to the roller are not moved in the axial direction, and therefore, the exchange of the roller can be easily carried out.

According to the present invention, it is possible to provide the image forming apparatus capable of performing stable electric power supply with a simple constitution while suppressing the occurrence of inconveniences due to the abrasion of the shaft portion of the roller pressurized and energized in the image forming apparatus or the abrasion of the electrical connecting portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-171010 filed on Sep. 30, 2023, which is hereby incorporated by reference herein in its entirety.

What is claimed is:

1. An image forming apparatus comprising:

an image bearing member configured to bear a toner image;

a transfer roller including a rotatable roller portion and a shaft portion projected from each of one end portion and the other end portion of the roller portion with respect to a rotational axis direction of the roller portion, the transfer roller being configured to transfer the toner image borne on the image bearing member under application of a transfer voltage;

a first bearing mounted to the shaft portion at the one end portion;

a second bearing mounted to the shaft portion at the other end portion;

a first holding member provided movably in a direction crossing a rotational axis of the transfer roller and capable of holding the first bearing, wherein the first holding member holds the first bearing so as to be detachably mountable thereto in a direction crossing the rotational axis of the transfer roller;

a second holding member provided movably in a direction crossing the rotational axis of the transfer roller and capable of holding the second bearing, wherein the second holding member holds the second bearing so as to be detachably mountable thereto in a direction crossing the rotational axis of the transfer roller;

a first urging member configured to urge the first holding member toward the image bearing member;

a second urging member configured to urge the second holding member toward the image bearing member; and a contact member supported movably relative to the first holding member and provided so as to be contactable to an outer peripheral surface of the first bearing, wherein the contact member forms a power supply path to the transfer roller, wherein with respect to a direction in which the first holding member is urged by the first urging member, the contact member is configured to contact the first bearing on a side upstream of a rotation center of the transfer roller so as not to be disposed on a side downstream of the rotation center of the transfer roller.

2. An image forming apparatus according to claim 1, wherein the contact member is disposed so as to be provided in a projection region in which the first bearing is projected in a moving direction of the first holding member.

3. An image forming apparatus according to claim 1, wherein the first holding member is provided with a curved surface for holding the outer peripheral surface of the first bearing and an opening provided in the curved surface, and wherein the contact member is supported so as to be contactable to the first bearing through the opening.

4. An image forming apparatus according to claim 1, wherein the first urging member urges the first holding member toward the image bearing member, and presses the contact member against the first bearing by urging the contact member toward the first bearing.

5. An image forming apparatus according to claim 1, wherein in a state in which the transfer roller is separated from the image bearing member, the contact member is urged, and at least a part of an abutting portion of the contact member contactable to an outer periphery of the first bearing projects further toward a first bearing side than at least a part of an abutting portion of the first holding member contactable to the outer periphery of the first bearing.

6. An image forming apparatus according to claim 1, wherein the first urging member constitutes a power supply path to the contact member.

7. An image forming apparatus according to claim 1, wherein the contact member is held only by the first holding member of the first and second holding members.

8. An image forming apparatus according to claim 1, wherein the contact member is constituted by an electroconductive resin.

9. An image forming apparatus according to claim 1, wherein the first bearing and the second bearing are fixed by being press-fitted to the shaft portion, wherein the first holding member is provided with a positioning portion for positioning the first bearing with respect to a rotational axis direction of the transfer roller, and wherein the second holding member is configured to hold the second bearing with play with respect to the rotational axis direction of the transfer roller.

* * * * *